Oct. 6, 1970     H. SCHMIDT     3,532,416

INTERMEDIATE IMAGE FORMING SYSTEM FOR TELESCOPE

Filed Dec. 19, 1967

INVENTOR
Horst Schmidt
BY
ATTORNEY

United States Patent Office 3,532,416
Patented Oct. 6, 1970

---

3,532,416
INTERMEDIATE IMAGE FORMING SYSTEM FOR TELESCOPE
Horst Schmidt, Wetzlar, Germany, assignor to Ernst Leitz GmbH., Wetzlar, Germany
Filed Dec. 19, 1967, Ser. No. 691,835
Claims priority, application Germany, Dec. 21, 1966,
L 55,322
Int. Cl. G02b 9/62, 13/22
U.S. Cl. 350—215                                       2 Claims

ABSTRACT OF THE DISCLOSURE

An intermediate image forming system for telescopes is disclosed which system comprises in known manner two halves of an aplanat system. In order to increase the distance between said aplanat halves two Galilean type telescopes are inserted in opposite direction to each other between said halves. One telescope being allocated to the front aplanat half, the second telescope being allocated to the rear aplanat half. Both telescopes serve to lengthen those focal distances of said aplanat halves which extend towards each other. One particular embodiment is disclosed wherein the two Galilean type telescopes are arranged symmetrically to the plane of the telescope pupil. In said embodiment is further illustrated a hinged mirror adapted to reflect the light beams to an image converter tube.

BACKGROUND OF THE INVENTION

(1) Field of the invention

The present invention relates to telescopes. More particularly, the invention relates to an intermediate image forming system being part of said telescopes.

(2) Description of the prior art

It is well known in the art to use two halves of an aplanat as the intermediate image forming systems in telescopes. If, however, the distance between said two halves of the aplanat is too great it may not always be possible to meet all mechanical and optical requirements, such as diameter, aperture, angle of view, etc. If in those cases this distance cannot be reduced by increasing the focal distances of said aplanat halves which extend towards each other it may easily be that in the case of a particular required angle of view the aperture is reduced to zero.

This, for example, can happen if the first aplanat half is transmitted by two different light beams which are separated behind said half and which are of different geometrical properties. As an example the well known day and night gun sights may be pointed out wherein behind the first aplanat half a separation of the light beams is performed, one portion being utilized for daylight observation, the other portion being utilized for night observation by means of an image converter tube.

SUMMARY OF THE INVENTION

The above outlined difficulty is obviated by the present invention which is characterized in that two Galilean type telescopes are inserted between said two aplanat halves, thereby increasing this focal distance of each aplanat which extends towards the other aplanat half. Each Galilean telescope is allocated to one aplanat half and both telescopes are positioned in opposite direction to each other. This arrangement is particularly advantageous if said Galilean telescopes are arranged symmetrically to the plane of the pupil. They may then even consist of single lenses only, because by the symmetrical arrangement the main image errors are compensated for.

BRIEF DESCRIPTION OF THE DRAWINGS

The invention will be more readily comprehended from the following description when taken in conjunction with the appending drawings, wherein

Referring now to FIG. 1 the intermediate image forming system comprises one aplanat half 1 and one aplanat half 2. The objective lens and the ocular of the telescope are not shown for sake of simplicity since both elements are known per se. It is to be assumed, however, that the objective lens—of which the image plane is indicated at 8—is positioned in front of aplanat half 1, while the ocular is positioned to the rear of aplanat half 2.

Figure 1:
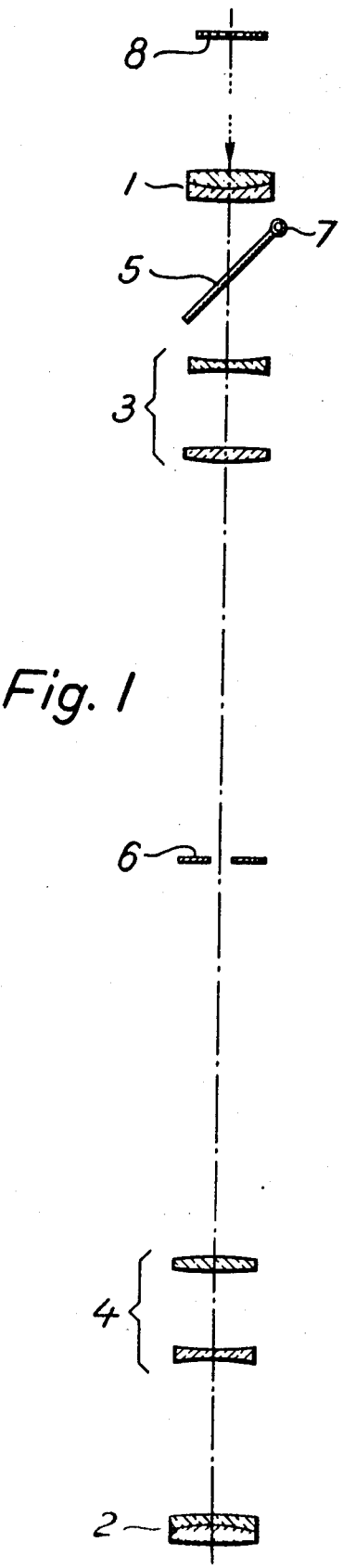
FIG. 1 is a schematic sectional view of the intermediate image forming system of a telescope.

Between said two aplanat halves two Galilean type telescopes 3 and 4 are arranged along the optical axis and are positioned reversed to each other and symmetrical to the telescope pupil plane designated by a diaphragm 6.

Inserted between aplanat half 1 and the first Galilean telescope 3 is a mirror 5 hinged on a shaft 7. Said mirror is tiltable between two end positions, preferably through an angle of 45 degrees. In its outward position the light beams are rendered free to travel to the second aplanat half 2, while in its inserted position the mirror reflects the incident light beams to an image converter tube (not shown) for night observation.

Figure 2:
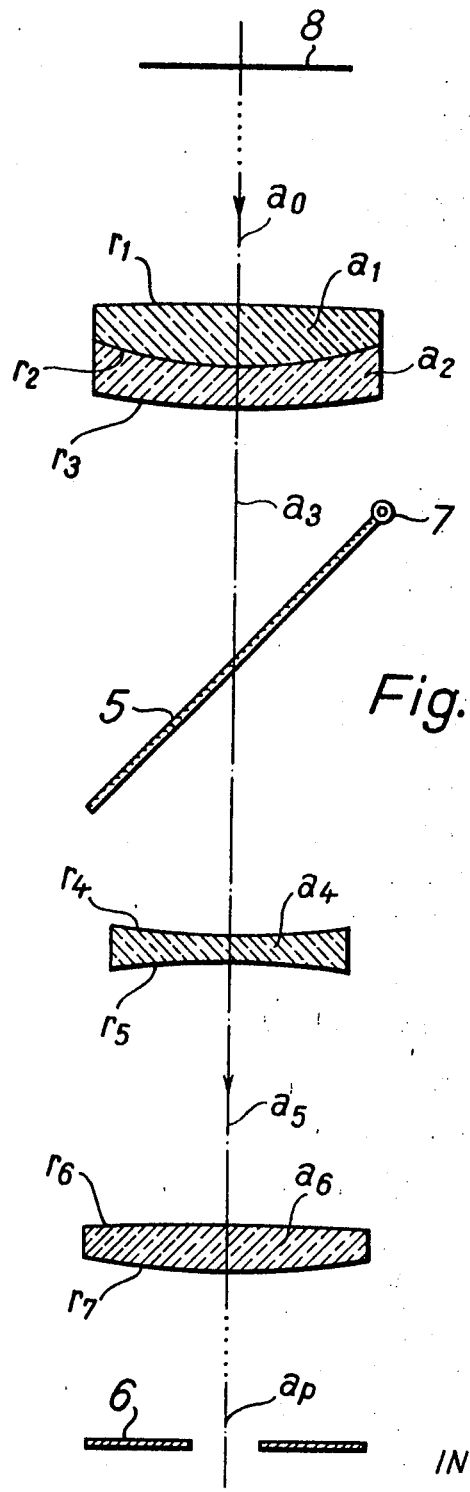
FIG. 2 is an enlarged portion of one-half of the intermediate image forming system wherein the radii and spacings of the lenses are denoted.

In the following table are listed the lens radii and spacings of a particularly advantageous embodiment of the invention. Said data are to be read in connection with FIG. 2 wherein the front half of the intermediate image forming system according to FIG. 1 is illustrated on an enlarged scale. The rear half of the system (not shown in FIG. 2) is similar to the front half with the pupil plane 6 constituting the plane of symmetry.

|  |  | $n_e$ | $v_e$ |
|---|---|---|---|
| $r_1 = 830$ | $a_0 = 259.2$ |  |  |
|  | $a_1 = 10$ | 1.6111 | 45.97 |
| $r_2 = -84$ |  |  |  |
|  | $a_2 = 6$ | 1.8550 | 23.64 |
| $r_3 = -338$ |  |  |  |
|  | $a_3 = 90$ |  |  |
| $r_4 = -145$ |  |  |  |
|  | $a_4 = 5$ | 1.5643 | 44.95 |
| $r_5 = 206$ |  |  |  |
|  | $a_5 = 45$ |  |  |
| $r_6 = 471$ |  |  |  |
|  | $a_6 = 7$ | 1.5713 | 55.85 |
| $r_7 = -150$ |  |  |  |
|  | $a_D = 220$ |  |  |

What is claimed is:

1. An intermediate image forming system for telescopes consisting of two halves of an aplanat, wherein the improvement comprises two Galilean type telescopes inserted between said two aplanat halves and along the optical axis, said Galilean type telescopes being arranged in reversed direction relative to each other, wherein the first half of the telescope comprises lenses and spacings of the following properties:

| | | $n_e$ | $v_e$ |
|---|---|---|---|
| $r_1 = 830$ | $a_0 = 259.2$ | | |
| | $a_1 = 10$ | 1.6111 | 45.97 |
| $r_2 = -84$ | $a_2 = 6$ | 1.8550 | 23.64 |
| $r_3 = -338$ | $a_3 = 90$ | | |
| $r_4 = -145$ | $a_4 = 5$ | 1.5643 | 44.95 |
| $r_5 = 206$ | $a_5 = 45$ | | |
| $r_6 = 471$ | $a_6 = 7$ | 1.5713 | 55.85 |
| $r_7 = -150$ | $a_p = 220$ | | | in which $r$ indicates the lens radii in millimeters, $a$ indicates the spacing between lens surfaces in millimeters, $n_e$ stands for index of refraction and $v_e$ stands for Abbe value, and wherein the second half of the telescope comprises lenses and spacings of similar properties arranged symmetrically to said first half with reference to the telescope pupil plane.

2. An intermediate image forming system for telescopes having two halves of an aplanat, wherein the improvement comprises:
a telescope pupil plane;
two optically aligned Galilean type telescopes positioned between said two aplanat halves and symmetrical with respect to the plane, said Galilean type telescopes having positive and negative lens members, said positive members being confrontingly positioned in equidistant spaced relation from opposite plane sides, and the negative members being symmetrically positioned behind the positive members relative to the plane.

References Cited

UNITED STATES PATENTS 2,899,862   8/1959   Baker _____ 350—215 X
3,387,140   6/1968   Roth et al.

FOREIGN PATENTS 1,022,255   12/1952   France.

JOHN K. CORBIN, Primary Examiner

U.S. Cl. X.R.
350—202, 210, 212